May 20, 1958
G. W. MORTE
2,835,266
POWER TRANSMISSION
Filed March 24, 1955
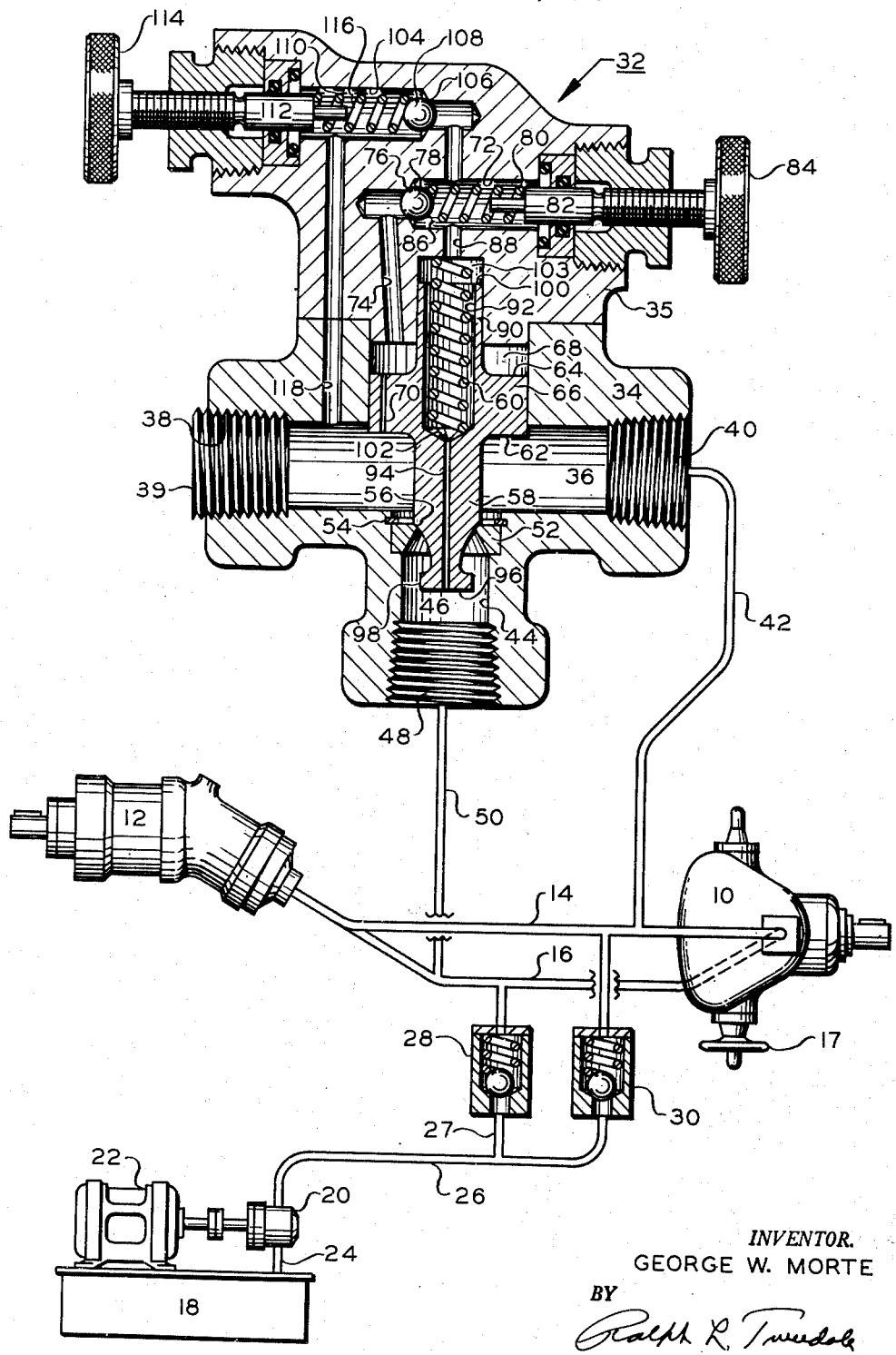
INVENTOR.
GEORGE W. MORTE
BY
Ralph R. Tweedale
ATTORNEY

United States Patent Office 2,835,266
Patented May 20, 1958

2,835,266

POWER TRANSMISSION

George W. Morte, Odessa, Tex., assignor to Vickers Incorporated, Detroit, Mich., a corporation of Michigan Application March 24, 1955, Serial No. 496,480

8 Claims. (Cl. 137—108)

This invention relates to power transmissions, and is particularly applicable to those of the type comprising two or more fluid pressure energy translating devices, one of which may function as a pump and another as a fluid motor.

The invention pertains generally to pressure control valves and is more particularly concerned wtih an improved pressure relief valve adapted for the purpose of controlling fluid pressure in two lines of a hydraulic power transmission system.

Conventional types of relief valves are adapted to control the pressure in one line or conduit of hydraulic power transmission systems for preventing the building up of pressure beyond an undesired point. One type of valve construction which has been particularly successful for this type of duty utilizes a control piston for operating a main valve and provides a control chamber in communication with the pressure space of the main valve. One operating surface of the control piston is exposed to pressure in the pressure space while the opposed operating surface of the control piston is exposed to pressure in the control chamber. A pilot relief valve is in communication with the control chamber and opens at a predetermined pressure setting to vent the control chamber and thus create unbalanced pressure forces on the control piston of the main valve for operating the same to the open or pressure relieving position.

Valves of this character overcome many of the operating deficiencies of the direct acting type of relief valve comprising a valve member directly backed by a spring member, the loading of which determines the pressure at which the valve is operated. The balanced type of relief valve is well adapted to the high pressure service requirements of hydraulic power systems because of the absence of the heavy spring necessary in any directly operated relief valve and because of their stable and accurate characteristics in holding pressure at a constant value at different discharge rates through the valve.

Although both types of relief valves have been widely used and they operate in a manner to relieve excessive pressure from a first high pressure line to a second low pressure line, they are not adapted to relieve high pressure from the second line to the first line when the low pressure line becomes a high pressure line and the high pressure line becomes a low pressure line, such as in closed circuit transmissions. In closed hydraulic circuits, either of the two conduits interconnecting the fluid pump and motor may be either a high pressure delivery line or a low pressure motor return line dependent upon the direction of operation of the system. Consequently, it has been the practice to incorporate two pressure relief valves in closed systems so that no matter what is the high pressure delivery line at the moment of operation at least one of the relief valves stands ready to relieve excessive pressure fluid from whatever is the high pressure line at the moment to the low pressure line.

It is therefore an object of this invention to provide an improved pressure controlling or relief valve.

It is another object of this invention to provide an improved pressure relief valve including two terminal connection ports with mechanism for causing either of the ports to be utilized as a pressure relieving port while the other is utilized as a high pressure inlet port.

It is still another object of this invention to provide an improved pilot controlled, balanced type of pressure relief valve having reverse flow pressure relieving characteristics and advantages.

It is also an object of this invention to provide a pressure controlling device adaptable for closed circuit hydraulic transmission systems which incorporates favorable construction and operational features of balanced types of pressure controlling valves.

It is a further object of this invention to provide an improved pressure control valve the structure of which is simple and compact, and which has features of reliability and efficient performance.

Further objects and advantages of the present invention will be apparent from the following description, reference being had to the accompanying drawing, wherein a preferred form of the present invention is clearly shown.

In the drawing:

The single figure is a diagrammatic view of a closed circuit hydraulic power transmission system incorporated within which is a preferred form of the present invention.

Referring to the single figure, there is shown a reversible variable displacement pump 10 adapted to be driven by a prime mover, not shown, which is interconnected in a closed circuit to a fixed displacement fluid motor 12 by conduits 14 and 16, either of which may be a high pressure delivery conduit or a low pressure return conduit. The pump 10 is provided with a hand wheel 17 for regulating variable displacement mechanism of the device, not shown, and for also shifting said mechanism to either side of a neutral position for reversing the direction of displacement of the pump.

Make-up fluid for the closed circuit is provided by a fluid reservoir 18 mounted upon which is a replenishing pump 20 driven by an electric motor 22. The inlet of the replenishing pump 20 is connected to the reservoir 18 by a conduit 24 and the outlet thereof is connected by a replenishing conduit 26 to the closed circuit conduit 14 and by a branch replenishing conduit 27 to the closed circuit conduit 16. Duplicate check valves 28 and 30 are incorporated in the conduits 26 and 27 to permit flow to either of the conduits 14 and 16, dependent on which conduit happens to be the return conduit so as to replenish the inlet side of the closed circuit.

Means for controlling the maximum pressure in the closed circuit is provided by a pressure relief valve indicated generally by the numeral 32 which is adapted to relieve excessive pressure fluid from the high pressure conduit to the low pressure conduit in the closed circuit dependent upon the direction of operation of pump 10. The relief valve 32 comprises a body member 34 containing flow passages and main valve controlling mechanism and a cover 35 for the body in which is provided auxiliary control passages and having mounted therein pilot relief valve mechanism adapted to cooperate with the passages and main valve in the body member 34. The body member 34 is provided with a longitudinal passage 36 extending completely therethrough provided with optional terminal connection ports 38 and 40 at its opposite ends, only one of which is utilized while the other is plugged. Port 38 has been illustrated as closed with a plug 39 while port 40 is illustrated as being connected to the conduit 14 in the closed circuit by a conduit 42.

Extending from the lower end of the body 34 into the cover 35 and intersecting the passage 36 is a stepped bore 44 the lower end of which forms a passage 46 having a terminal connection port 48 which is connected to the closed circuit conduit 16 by a conduit 50. The body passages 36 and 46 thus form a continuous flow passage with connection ports 40 and 48 at the terminals of said passage.

A valve seat 52 is mounted in the stepped bore 44 so as to be interposed in the continuous flow passage comprising passages 36 and 46 and is retained therein by a snap ring 54. The opening 56 of the seat 52 is normally closed by a main valve indicated by the numeral 58 which is biased to the position shown by a light spring 60. The valve 58 is constructed with two pairs of opposed, substantially balanced operating surfaces, one pair comprising surfaces 62 and 64 on opposite sides of a control piston 66. The surface 62 of the control piston 66 is exposed to pressure in the passage 36 while the opposed surface 64 of the control piston is exposed to pressure in a control chamber 68 formed by mounting the piston 66 in the stepped bore 44. The control member 68 is connected to the passage 36 by a restricted passage 70 in the control piston 66 and is connected to a stepped bore 72 by a passage 74.

A valve seat 76 formed in the bore 72 is controlled by a pilot relief valve 78 retained on the seat by a spring 80 of predetermined resistance the loading of which may be varied by an adjusting member 82 extending from the cover 35 and provided with a hand wheel 84 for the adjustment. The spring 80 is mounted in an exhaust chamber 86 formed in the stepped bore 72 which is connected to the stepped bore 44 in which main valve 58 is mounted by a passage 88. For the purpose of connecting the exhaust chamber 86 to the passage 46 and terminal connection port 48 the control piston 66 is provided with an upright stem 90 having a hollow portion indicated by the numeral 92 the latter of which leads to the passage 46 by a restricted passage 94 in the valve 58.

Operating surfaces 62 and 64 of control piston 66 are substantially balanced and are normally exposed to the same pressure. Valve 58 is adapted to remain seated when conduit 14 is the pressure delivery conduit until a pressure arises in said conduit greater than the resistance of pilot relief valve spring 80. When a pressure is created as determined by the adjusted loading of spring 80 the pilot relief valve 78 is operated from the seat to vent the control chamber 68 causing the pressure in the control chamber to be lowered and thus unbalancing the pressures on the opposed operating surfaces 62 and 64. With unbalanced pressures on the opposed operating surfaces 62 and 64 the valve 58 is operated upwardly against the slight resistance of spring 60 to open the seat 52 and connect passage 36 to passage 46 through the seat opening 56. The high pressure conduit 14 is then connected to the low pressure conduit 16 through the conduit 42, port 40, passage 36, seat opening 56, passage 46, port 48 and conduit 50. When the pressure in conduit 14 which is transmitted to pilot relief valve 78 by means of passage 36, restricted passage 70 in control piston 66, control chamber 68, passage 74 and stepped bore 72, falls below the loading of pilot valve spring 80 the pilot valve 78 closes the seat opening 76 and the control chamber 68 no longer is vented. The pressure in control chamber 68 equalizes with that in passage 36 and with equal pressures on opposed surfaces 62 and 64 the spring 60 returns the valve 58 to the position shown to close port 40 and passage 36 from communication with passage 46 and port 48.

Another pair of opposed operating surfaces are provided for the valve 58 comprising an end surface 96 of a skirt 98 of the valve 58 which is exposed to pressure in the passage 46 and opposed to which is the end surface of stem 90 indicated by the numeral 100 plus the surface area of an inner wall 102 in the control piston 66 at one end of the hollow portion of 92. The upper portion of stepped bore 44 within which the stem 90 is mounted together with the hollow portion 92 of the stem and control piston 66 form a control chamber indicated generally by the numeral 103. The control chamber 103 is connected to a stepped bore 104 in the upper portion of cover 35 by the passage 88.

A valve seat 106 formed in the bore 104 is normally closed by a pilot relief valve 108 resiliently biased on the seat 106 by a spring 110 of predetermined resistance, the loading of which may be varied by an adjusting member 112 extending from the cover 35 and having a handwheel 114 for manual adjustment of the same. The spring 110 is mounted in an exhaust chamber 116 formed in the stepped bore 104 which leads to passage 36 in the body 34 by means of a continuous passage 118 formed in the cover and body. When the pump 10 is operated in a direction to constitute conduit 16 as the high pressure delivery conduit, pressure in such conduit is transmitted to the end surface 96 of skirt 98 by conduit 50, port 48 and passage 46. Pressure in the conduit 16 is also transmitted to the control chamber 103 and to the opposed operating surface, comprising the areas 102 and 100, by the restricted passage 94 in the valve 58.

Until the control member 103 is vented the pressures on the opposed operating surfaces recited remain equalized and the valve 58 remains seated to close the seat opening 56 and communication between the terminal ports 48 and 40. When a pressure equal to the adjusted loading of spring 110 of pilot valve 108 is created in pressure delivery conduit 16, the pilot relief valve 108 is operated from the seat 106. Pressure in conduit 16 is transmitted to the pilot relief valve 108 by means of conduit 50, port 48, passage 46, restricted passage 94 in valve 58, hollow portion 92 of stem 90 and the upper portion of stepped bore 44 comprising control chamber 103, passage 88 and the stepped bore 104. When the pilot valve 108 is operated from the seat 106 the control chamber 103 is vented to the conduit 14 and thus to the low pressure side of the pump 10 by means of exhaust chamber 116, passage 118, passage 36, port 40 and conduit 42. The pressures on the operating surface 96 and the opposed operating surface comprising areas 100 and 102 become unbalanced and the valve 58 is operated upwardly to open communication of the port 48 and passage 46 with the passage 36 and 40. The high pressure conduit 16 is thus connected to the low pressure conduit 14 to connect the outlet side of the pump to the inlet side thereof and maintaining the pressure in the high delivery conduit at a predetermined maximum.

When the pressure falls below the loading of spring 110 of pilot valve 108 the pilot valve closes its associated seat opening and the control chamber 103 is no longer vented. The pressures on the opposed operating surfaces 96 and the surfaces comprising the areas 102 and 100 become equalized and the spring 60 returns valve 58 to the closed position shown. When the conduit 14 is the high pressure conduit and valve 58 is shifted upwardly to the open position fluid displacement from the control chamber 68 may escape to exhaust chamber 86 through the opened pilot relief valve 76. Fluid displacement from the control chamber 103 is permitted to escape to the low pressure conduit 16 by means of the restricted passage 94 in the valve 58, passage 46, port 48 and the conduit 50.

When conduit 16 is the high pressure conduit and the valve 58 is shifted upwardly, fluid displaced from the control chamber 103 is permitted to escape to exhaust chamber 116 through the opened pilot relief valve 108. Fluid displaced from the control member 68 is permitted to escape to the low pressure conduit 14 by means of the restricted passage 70 in control piston 66, passage 36, port 40 and the conduit 42. The restricted passages 70 and 94 in the control piston 66 and the valve 58 respectively may be sized to provide desirable dash-pot action on the valve 58.

There is thus provided an efficient pilot operated main relief valve of the balanced type adapted to relieve excessive pressure fluid from a first port to a second port of the valve when high pressure is transmitted to the first port and also adapted to relieve excessive pressure fluid from the second port to the first port when high pressure is transmitted to the second port. Opposed, substantially balanced operating surfaces are provided for the valve which are exposed to high pressure transmitted to the first port. A control chamber is vented by a pilot relief valve when a predetermined pressure arises at the first port to unbalance the pressures on the opposed operating surfaces and causing the main valve to be operated to the pressure relieving position. A second pair of opposed, substantially balanced operating surfaces are provided for the valve which are exposed to high pressure transmitted to the second port. A second control chamber is vented by a second pilot relief valve when a predetermined pressure arises at the second port to unbalance the pressures on the second pair of opposed operating surfaces for causing the valve to be operated to the pressure relieving position.

The pilot valve operated main valve is thus particularly adapted for closed circuits by relieving excessive pressure fluid from whatever happens to be the high pressure side of the circuit to the low pressure side of the circuit. Modifications and structure of the valve are readily apparent. It is possible for example to mount the main relief valve in a main body member and mount the pilot relief valves in separate bodies and connect the same in a circuit such as disclosed. It is also possible to mount the main relief valve in a body and one of the pilot relief valves in a cover similar to conventional balanced relief valves of this type and to mount the other pilot relief valve in a separate body and connect the same in a circuit such as disclosed. It is more feasible, however, to mount both pilot relief valves in a cover, such as shown, provided with passages forming an internal circuit with the ports and passages of the main body and main valve. This type of construction eliminates extra conduits, only two conduits connected to the closed circuit being necessary, which is important in some applications with restricted space requirements. The main valve body and cover may be economically provided with the stepped bores and passages for cooperation between the main valve and pilot relief valves. The types of main valve and pilot relief valves utilized are also well known and may be constructed at low cost to give maximum efficiency and long life.

While the form of embodiment of the invention as herein disclosed constitutes a preferred form, it is to be understood that other forms might be adopted, all coming within the scope of the claims which follow.

What is claimed is as follows:

1. Pressure regulating mechanism comprising in combination means forming a flow passage having terminal connection ports either of which is adapted to be a high pressure inlet port while the other is a low pressure relief port, a main valve shiftably interposed in the passage resiliently biased to a position closing the passage and forming two control chambers, said control chambers being independently connected to the passage on opposite sides of the valve, means forming two pairs of opposed valve operating surfaces, one surface of each pair of surfaces being respectively exposed to pressure in the control chambers and the remaining opposed surface of each pair of surfaces being respectively exposed to pressure in the passage on opposite sides of the valve, and separate pilot control valves independently connected to the control chambers, each pilot valve being responsive at a predetermined pressure in its associated control chamber to vent said chamber to a low pressure source for unbalancing the pressures on the pair of operating surfaces associated therewith for causing the main valve to be operated and open the passage.

2. Pressure regulating mechanism comprising in combination means forming a flow passage having terminal connection ports either of which is adapted to be a high pressure inlet port while the other is a low pressure relief port, a main valve shiftably interposed in the passage resiliently biased to a position closing the passage and forming two control chambers, means forming two pairs of opposed valve operating surfaces, one pair of opposed surfaces being respectively exposed to pressures in one of the control chambers and in the passage on one side of the valve and the other pair of opposed surfaces being respectively exposed to pressures in the other control chamber and in the passage on the other side of the valve, means forming restricted passages independently connecting the flow passage on opposite sides of the valve to the control chambers, and a separate pilot control valve connected to each control chamber, each pilot control valve being responsive at a predetermined pressure in its associated control chamber to vent said chamber to a low pressure source for unbalancing the pressures on the pair of operating surfaces associated therewith for causing the main valve to be operated and open communication between the ports.

3. Pressure regulating mechanism comprising in combination means forming a flow passage having terminal connection ports either of which is adapted to be a high pressure inlet port while the other is a low pressure relief port, a main valve shiftably interposed in the passage resiliently biased to a position closing the passage and forming two control chambers, said control chambers being independently connected to the passage on opposite sides of the valve, means for operating the main valve to the open position when high pressure is transmitted to one of said ports comprising a first pair of opposed valve operating surfaces, one of which is exposed to pressure in one of the control chambers and the other of which is exposed to pressure in the passage transmitted thereto through said one port, and a pilot control valve responsive at a predetermined pressure in said one control chamber to vent said chamber to a low pressure source for unbalancing the pressures on the first pair of operating surfaces, and means for operating the main valve to the open position when high pressure is transmitted to the other of said ports comprising a second pair of opposed valve operating surfaces, one of which is exposed to pressure in the other control chamber and the other of which is exposed to pressure in the passage transmitted thereto through the second port, and a second pilot relief valve responsive at a predetermined pressure in said second control chamber to vent said control chamber to a low pressure source for unbalancing the pressures on the second pair of operating surfaces.

4. A pressure controlling device comprising a body member having two terminal connection ports connected by a flow passage, either of which port is adapted to be a high pressure inlet port or a low pressure relief port, a main valve shiftably mounted in the body resiliently biased to a position closing the passage and forming two control chambers, means forming two pairs of opposed valve operating surfaces, one pair of opposed surfaces being respectively exposed to pressures in one of the control chambers and in the passage on one side of the valve and the other pair of opposed surfaces being respectively exposed to pressures in the other control chamber and in the passage on the other side of the valve, and separate pilot control valves independently connected to the control chambers and responsive at predetermined pressures therein for venting their associated control chambers to the flow passage on whichever side of the valve leads to the low pressure port, the pressures on the operating surfaces of the main valve becoming unbalanced and causing the same to be operated to the open position.

5. A pressure controlling device comprising a body member having two terminal connection ports connected by a flow passage, either of which port is adapted to be a high pressure inlet port or a low pressure relief port, a main valve shiftably mounted in the body resiliently biased to a position closing the passage and forming two control chambers, means forming restricted passages independently connecting the flow passage on opposite sides of the main valve to the control chambers, means forming two pairs of opposed valve operating surfaces, one pair of opposed surfaces being respectively exposed to pressure in one of the control chambers and in the passage on one side of the valve and the other pair of opposed surfaces being respectively exposed to pressures in the other control chamber and in the passage on the other side of the valve, and separate pilot control valves independently connected to the control chambers and responsive at predetermined pressures therein for venting their associated control chambers to the flow passage on whichever side of the valve leads to the low pressure port, the pressures on the operating surfaces of the main valve becoming unbalanced and causing the same to be operated to the open position.

6. A pressure controlling device comprising a body member having two terminal conection ports connected by a flow passage, either of which port is adapted to be a high pressure inlet port or a low pressure relief port, a main valve shiftably mounted in the body resiliently biased to a position closing the passage and forming two control chambers, means forming restricted passages connecting the flow passage on opposite sides of the main valve to the control chambers, means forming two pairs of opposed valve operating surfaces, one pair of opposed surfaces being respectively exposed to pressures in one of the control chambers and in the passage on one side of the valve and the other pair of opposed surfaces being respectively exposed to pressures in the other control chamber and in the passage on the other side of the valve, means forming auxiliary passages connecting the control chambers to the flow passage on opposite sides of the valve, and a pilot control valve for each passage normally closing the same, each pilot relief valve being responsive at a predetermined pressure in its associated auxiliary passage for venting its associated control chamber to the low presssure side of the flow passage for unbalancing the pressures on the operating surfaces of the main valve and causing the same to be operated to the open position.

7. Pressure regulating mechanism comprising means forming a flow passage having terminal connection ports either of which is adapted to be a high pressure inlet port while the other is a low pressure relief port, a main valve shiftably interposed in the passage resiliently biased to a position closing the passage and forming two control chambers, said control chambers being independently connected to the passage on opposite sides of the main valve, means forming two pairs of opposed valve operating surfaces, one pair of opposed surfaces being respectively exposed to pressures in one of the control chambers and in the passage on one side of the valve and the other pair of opposed surfaces being respectively exposed to pressures in the other control chamber and in the passage on the other side of the valve, two pilot control valves separately connected to the control chambers, each pilot control valve including resilient means biasing the valve to the closed position and each valve being responsive at a predetermined pressure in its associated control chamber to vent said chamber to a low pressure source thereby unbalancing the pressures on the operating surfaces assocaited therewith for causing the main valve to be operated and open the passage, and separate means for independently adjusting the resilient biasing means of each pilot control valve for determining the pressures at the inlet and the outlet ports at which the main valve is to be operated to the open position.

8. Pressure regulating mechanism comprising means forming a flow passage having terminal connection ports either of which is adapted to be a high pressure inlet port while the other is a low pressure relief port, a main valve shiftably interposed in the passage resiliently biased to a position closing the passage and forming two control chambers, means forming two pairs of opposed valve operating surfaces, one pair of opposed surfaces being respectively exposed to pressures in one of the control chambers and in the passage on one side of the valve and the other pair of opposed surfaces being respectively exposed to pressures in the other control chamber and in the passage on the other side of the valve, means forming restricted passages independently connecting the flow passage on opposite sides of the valve to the control chambers, two pilot control valves separately connected to the control chambers, each pilot control valve including resilient means biasing the valve to the closed position and each valve being responsive at a predetermined pressure in its associated control chamber to vent said chamber to a low pressure source thereby unbalancing the pressures on the operating surfaces associated therewith for causing the main valve to be operated and open the passage, and separate means for independently adjusting the resilient biasing means of each pilot control valve for determining the pressures at the inlet and the outlet ports at which the main valve is to be operated to the open position.

References Cited in the file of this patent

UNITED STATES PATENTS

| 2,122,045 | Rose et al. | June 28, 1938 |
| 2,400,418 | Hofbauer | May 14, 1946 |
| 2,716,995 | Baugh et al. | Sept. 6, 1955 |